3,405,821
METHOD OF AND APPARATUS FOR CHARGING FURNACES
Alfred Slesaczek, Kusnacht, Switzerland, and Ludwig Blinn, Spiesen (Saar), Germany, assignors to Maerz Ofenbau AG., Zurich, Switzerland, and Pohlig-Heckel-Bleichert Vereinigte Maschinenfabriken AG., Saarbrucken, Germany
Filed Nov. 22, 1965, Ser. No. 508,899
7 Claims. (Cl. 214—26)

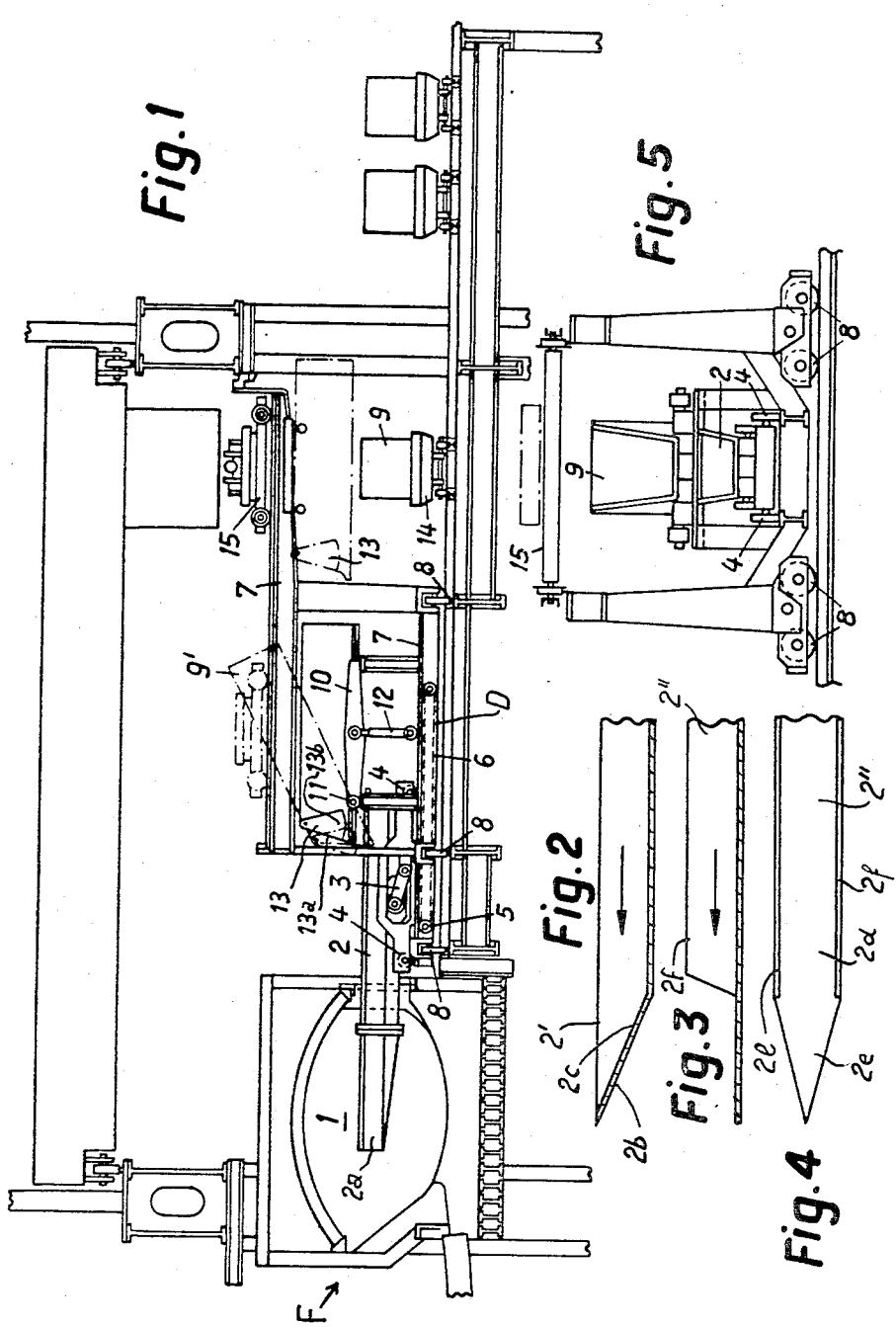

ABSTRACT OF THE DISCLOSURE

A method and apparatus for scrap-charging a steel smelting furnace by means of a conveyor trough in which the conveyor trough is introduced bit by bit into the interior of the furnace and then slowly removed during which process scrap is continually discharged from the conveyor trough. The conveyor trough is maintained in a substantially horizontal plane and is oscillated throughout the inward and outward movement of same in the furnace so as to cause the scrap to leave the discharge end of the conveyor trough and fall into the furnace interior. The conveyor trough is heat-protected throughout its journey within the furnace interior by the layer of scrap upon the conveyor trough as well as by the newly discharged layer of scrap beneath the conveyor trough within the furnace interior.

---

The present invention relates to a new and improved method of, and apparatus for, charging steel smelting furnaces with scrap and the like.

The charging of open-hearth smelting furnaces with scrap is effected by means of troughs, i.e. rectangular, upwardly-open scrap containers. These troughs are introduced into the furnace with the aid of a crane arm, emptied by tipping and again removed from the furnace. With the aid of the trough-charging process, any desired quantity of scrap can be introduced into any desired point in the hearth.

The distribution of the scrap can be adapted entirely to the requirements of the smelting works. Charging by means of troughs has, however, several considerable disadvantages. The trough-weight is relatively large as a dead weight in comparison with the net weight of the scrap and, during the conveying of the scrap, it is necessary to co-convey a considerable dead weight and this makes the charging step expensive. The second, still greater disadvantage resides in the idle running times. Scrap is introduced into the hearth only during the time during which the trough is tipped. The introduction of the filled troughs and the removal of the empty troughs constitute idle running times, during which the furnace doors must be open, with a consequent additional loss of heat and, above all, a very considerable loss of time. To this must also be added those idle running times which are necessary for the displacement of the troughs externally of the furnace, such as the lifting-away of the troughs from the trough stand, the rotation of the charging crane, the travel to the furnace, the return travel and re-depositing of the empty troughs, etc. All these idle times are that much larger, the smaller the capacity of a trough, i.e. the greater the number of troughs per charge. Unfortunately, however, the dimensions of the furnace chamber limit the trough size. The idle times during charging by means of troughs at the present time restrict the output of the open-hearth furnaces in most steel works, since rapid introduction of the scrap is the first prerequisite for a short smelting duration. By increasing the heating intensity, in particular with the use of oxygen, the present-day efficiencies of many open-hearth furnaces can be considerably increased, but only provided that substantially shorter charging times are achieved than are nowadays conventional. Thus, the existing charging devices constitute the "bottle neck" of nearly all open-hearth steel works.

This realisation has resulted in a series of proposals for new charging methods which, however, are either constructionally or mechanically difficult to carry into effect, or involve other weighty disadvantages. The proposal to introduce the scrap by means of a basket (as in electric arc furnaces) through the furnace roof in one charging step first of all causes considerable difficulty in the design of the roof. This procedure has, however, also a considerable heat-technical disadvantage. The surface of the cold scrap which is subjected to the action of the flame is only the surface of the heap of scrap and is therefore relatively small. A heap of scrap of this kind would soon melt at its surface, whilst remaining cold downwardly. Since the greatest quantities of heat are transferred from the flame to the scrap when the temperature-drop is considerable, i.e. the scrap temperature is low, it is necessary to subject the largest possible surfaces of the cold scrap to the action of the flame. Thus, the scrap must be introduced layer-wise and must be heated layer-wise. The individual scrap layers must be introduced as rapidly as possible and only after the heating of the layer introduced must the next scrap layer be laid on it, again as rapidly as possible.

It has also already been proposed to allow the scrap to slip into the furnace with the aid of an inclined trough set up externally of the furnace. The scrap, according to this proposal, is to drop through the furnace chamber in the form of a projection parabola. With this mode of charging, additional charging apertures, positioned at a higher level, are necessary in the front wall of the furnace or in the arch, this making the construction of the furnace considerably more complicated and diminishing the durability of the furnace parts recessed to form the charging apertures.

The scrap falls, in accordance with a projection parabola and with a relatively large impact, upon the hearth and this greatly reduces the durability of the hearth. Furthermore, aimed distribution of the scrap over the hearth is extremely difficult, if not impossible.

It is a primary object of the present invention to provide an improved charging device which overcomes these disadvantages.

Another important and more specific object of this invention relates to the provision of an improved scrap-charging device enabling efficient, safe and rapid charging of a furnace with a minimum of heat loss.

Still a further considerable object of this invention has reference to an improved method of, and apparatus for, charging a furnace with a minimum of idle time and in a manner such that the scrap-charging device itself is not detrimentally affected by the heat of the furnace.

The charging device for scrap according to the invention essentially comprises an oscillating conveyor wherein the oscillation-drive members are disposed only at that part of the conveyor trough which remains located externally of the furnace. The part of the conveyor trough entering into the furnace is completely free from mechanical devices and can, therefore, be subjected, without detriment, for a short period of time, to the influence of the furnace heat. The conveyor trough is displaceable in the conveying direction also during charging, so that it becomes possible to discharge it into the furnace even during the forward movement or advance. This results in two important advantages: any idle travel time during the charging of the furnace is avoided, since the trough begins with the discharge as soon as it enters the furnace chamber and completes the discharge when the end of the trough leaves the furnace chamber. The second advantage consists in the elimination of a cooling device in the front trough part which, in the charging of furnaces, in particular when what is concerned is a liquid cooling device, always proves a source of danger. The cold scrap discharged during the introduction of the conveyor trough shields the underside of the trough against the radiation from the interior of the furnace, since the underside of the trough is in direct radiation exchange with freshly discharged scrap. The same applies also to the return travel. The mouth of the trough is also cooled by cold scrap which flows continuously over the trough end. The inside of the trough is again cooled by the scrap which always completely fills the entire trough length disposed in the furnace.

Other features, objects and advantages of the invention will become apparent by reference to the following detailed description and drawing in which:

FIGURE 1 is a schematic side view of a preferred embodiment of inventive charging device;

FIGURE 2 schematically illustrates in fragmentary view the front end of the conveyor trough designed according to a modified embodiment;

FIGURES 3 and 4 show a further embodiment of the inner end of the conveyor trough, seen in longitudinal section and in plan, respectively; and FIGURE 5 depicts an end elevational view of the charging device according to FIGURE 1.

Describing now the drawing it is to be understood that reference numeral 1 designates the furnace chamber of the furnace F. The hearth is empty after the tap or run-off and is now to be charged with scrap. Reference numeral 2 designates the movable conveyor trough, the front portion of which is, to the extent that it is able to project into the furnace, free from any mechanical parts, such as drive means or the like. A suitable oscillating drive 3 for the conveyor trough which serves to jar the scrap or otherwise located upon the conveyor trough 2 and to move it towards the discharge end 2a thereof, is disposed on that part which always remains outside the furnace F. The conveyor trough 2, with the oscillating drive 3, is displaceable on the wheels 4 in the conveying direction. A feed drive D for the displacement of the trough 2 in the conveyor direction can be effected for example with the aid of a rotating chain drive, the rollers thereof being designated by reference numeral 5 and the chain by reference numeral 6. Of course, the feed or travel drive D could also be provided on the trough 2 itself and engage directly with the wheels 4.

The trough 2 adapted to be displaced in the direction of conveying of the material is arranged on a displaceable platform 7 which can be displaced by means of the wheels 8 transversely of the aforementioned conveying direction. The scrap container 9 is set down on a tipping device 10 located at the movable platform 7. The pivot-point of the tipping device is designated 11 and the hydraulic cylinder is designated 12. Of course, it is also possible to use some tipping device other than the one shown here by way of example. The scrap container 9 is closed at one end or side by a movable flap 13 which can be locked and which is intended to prevent the flowing-out of the scrap during transport to the furnace.

This scrap container 9 is conveyed, for example, on a trolley 14, to the charging machine, and is then lifted by means of a suitable travelling crab 15 disposed on the travelling platform 7 and set down on the tipping device 10. After the unlocking of the flap 13, the container 9 is tipped into the phantom line position 9', during which a small portion of scrap flows out and on to the bottom of the conveyor trough 2 in accordance with the angle of slope of the material and in accordance with the tipping angle. The flap 13 seals off the container by means of its end-face wall 13a, whereas its lateral walls or cheeks 13b are intended to prevent slipping-off of the scrap laterally of the trough 2 and to ensure that the scrap flowing out of the phantom line positioned container 9' always properly slides into the trough 2.

The filling of the conveyor trough 2 begins before charging. After the tipping of the scrap container 9, the oscillating conveyor trough 2 is put into operation and continuously removes scrap from the "bank" formed by the scrap between the container and the bottom of the trough, doing so by jarring movements. Due to the jarring movements an amount of scrap substantially corresponding to the scrap removed from the "bank" flows continuously, in a replenishing flow, out of the scrap container 9'. As soon as the scrap has reached the front or discharge end 2a of the trough 2 charging begins. This front end or portion 2a of the conveyor trough 2 is pushed gradually towards the rear wall into the furnace chamber 1 and begins to discharge the scrap directly after its entry into the furnace F. The scrap, which is moved at the oscillating conveyor trough 2 at a speed of for example 30 cm./sec., drops directly after entry of the trough into the furnace chamber 1 onto the hearth bottom and, during the forward movement on the wheels 4, "builds up" a cold layer of material which shields the underside of this trough 2 against the heat radiation of the furnace interior.

The conveying capacity of the conveyor trough 2 depends upon the conveying velocity of the scrap in the trough and on the cross-section of the trough, i.e. on the internal free width and the height of the trough. With double cross-section, double the quantity is conveyed. The feed or advance movement of the trough 2 in the conveying direction depends upon the width of the furnace F, since the portion of the trough projecting into the furnace must remain in the hot furnace only for a certain period of time, in order that it may not be damaged. With an extremely wide furnace, the trough 2 must be more rapidly displaced in the conveying direction than in the case of a furnace having a narrower hearth.

The arrangement of the tiltable or tipping scrap container 9 relative to the conveyor trough 2 is within the framework of the invention. The scrap container 9 must not be tipped to such a height that the entire scrap quantity could slip out, but only to such an extent that a heap or embankment of scrap is formed on the trough bottom, from which the oscillating trough 2 is able to continuously remove an appropriate quantity of scrap in accordance with its feed or advance movement. As this is done, about the same quantity of scrap removed from the conveyor trough 2 also slides continuously, in a replenishing flow, out of the scrap container 9'.

The conveying velocity of the scrap in the trough 2 is, by comparison with the velocity during the free fall undergone by the scrap upon leaving the trough, extremely small. With a conveying velocity of, for example 0.3 m./sec., the projection paraboli becomes extremely steep and differs only very slightly from a vertical. Since the scrap is horizontally conveyed in the trough 2, the conveying velocity in the trough also has no influence on the impact with which the scrap falls onto the bottom of the trough. This impact is therefore not increased or influenced by a considerable falling height such as constrainedly prevails with chutes set up externally of the furnace. Moreover, the almost vertical dropping-down of the scrap at the discharge end 2a of the trough 2 furthermore renders possible any desired distribution of the scrap over the width of the furnace F.

When the conveyor trough has been introduced through the doors in the front wall of the furnace, and since door posts of a specific width are disposed between the aforesaid furnace doors, there is formed between the introduced troughs of two adjacent doors a certain dead space which could not be directly charged with scrap if the trough were to discharge the scrap only in the direction of conveying. The scrap would be introduced only indirectly into these dead spaces. According to the invention, this disadvantage is avoided by the provision of a special design at the discharge end of the conveyor trough 2. Specifically, the conveyor trough 2 is advantageously provided with means which permit the discharge of the scrap not only in the feed direction but also laterally of the feed direction. For example, as shown in FIGURE 2, the trough 2' may be so designed that it has an ascending base portion 2b at the discharge end 2a. The ascending base portion 2b provides a certain degree of resistance to the conveying of the scrap, since the conveying velocity on the inclined face 2c is lower than in the horizontal trough. Since the trough always conveys uniformly, the resistance at the trough end results in damming-up of the material and in overflowing over the lateral walls at the discharge end 2a.

Another possibility for lateral discharge of scrap is depicted in FIGURE 3 wherein the base 2d of the trough 2" may also be tapered or obliquely cut off, whereby at least the triangular end 2e of the base 2d projects past the lateral walls 2f. Finally, it is also possible to provide a combination of the features according to FIGURES 2 and 3, or it is possible to also provide at the end of the obliquely cut-off trough bottom a projection or "nose" producing the lateral slipping-off of the scrap.

With the simple design of the scrap-charging machine according to the invention, the travelling platform 7 carries a conveyor trough 2. However, it would also be possible to arrange on this travelling platform 7 two conveyor troughs which may operate simultaneously and independently and which have the same spacing as two adjacent furnace doors. With the aid of two troughs, the scrap can be introduced simultaneously through two doors, so that the conveying efficiency can be doubled. The arrangement of two troughs is significant when, for constructional reasons, it is not possible to make the furnace doors wide and it is necessary to utilize a relatively large number of relatively narrow furnace doors. In the exemplary embodiment illustrated in the drawing, the scrap container 9 is brought up parallel to the furnace. The trolley may, however, also be rotated through 90° and move in the scrap container from the scrap yard, located directly adjacent the furnace room, in the conveying direction of the trough. When the scrap container is brought up parallel to the axis of the furnace, as shown, it is necessary to provide at the crab 15 which lifts the container 9 from the trolley 14 and sets it down on the tilting device 10, a pivoting mechanism for rotating the container through 90°. The scrap container 9 could, of course, also be set down on the platform 7 by means of a crane which is completely independent of the charging machine, but this method has the disadvantage that instead of operating only one machine, it is necessary to operate two machines (the charging machine and the crane).

While there is shown and described present preferred embodiments of the invention, it is to be distinctly understood that the invention is not limited thereto but may be otherwise variously embodied and practiced within the scope of the following claims.

What is claimed is:

1. A furnace charging apparatus for charging a furnace with a predetermined charge, said furnace charging apparatus comprising a conveyor trough having a charge discharge end, conveyor trough feed means for introducing said conveyor trough into the interior of the furnace, conveyor trough drive means comprising an oscillating drive for discharging charge from said conveyor trough at said charge discharge end immediately upon entry of said charge discharge end into the furnace and for continually discharging charge at said charge discharge end as said conveyor trough enters the furnace interior whereby a cold material layer is caused to continually build up as more and more of the conveyor trough enters the furnace interior, said conveyor trough feed means further defining means for removing said conveyor trough from the interior of the furnace, said conveyor trough drive means maintaining the continuous discharge of the charge while said conveyor trough is removed, said apparatus further comprising a travelling platform supporting said conveyor trough and displaceably mounted for movement transverse to the feed movement of said conveyor trough, a supply container for charge carried by said travelling platform and arranged above said conveyor trough, said supply container including a discharge end for the charge which is disposed over the path of feed movement of said conveyor trough.

2. An apparatus as defined in claim 1, further including tilting means carried by said travelling platform upon which said supply container is mounted for tilting movement.

3. An apparatus as defined in claim 1, wherein said conveyor trough includes a discharge end incorporating means for the lateral distribution of the charge.

4. An apparatus as defined in claim 1, wherein said conveyor trough is disposed in a substantially horizontal plane.

5. In the art of charging a furnace with a predetermined charge by means of a conveyor trough, the method of operating such conveyor trough in order to shield it against the radiant heat in the furnace, which comprises the steps of: introducing the conveyor trough bit by bit into the interior of the furnace, and immediately upon entry of the charge discharge end of the conveyor trough into the furnace continually discharging said charge at such discharge end in order to form a cold material layer which continually builds up as more and more of the conveyor trough enters the furnace interior, and then removing said conveyor trough from the interior of the furnace while maintaining said continuous discharge of said charge.

6. In the art of charging a furnace with a predetermined charge as defined in claim 5, further including the step of: oscillating the conveyor trough in order to cause said charge to leave the discharge end thereof and fall into the furnace interior.

7. In the art of charging a furnace with a predetermined charge as defined in claim 6, wherein said conveyor trough is introduced into the furnace by imparting a continuous feed movement to said conveyor trough in addition to said oscillatory movement, so that progressively more and more of said conveyor trough enters said furnace interior.

References Cited

UNITED STATES PATENTS

| 1,791,677 | 2/1931 | MacMichael. |
| 2,649,978 | 8/1953 | Smith _____ 214—26 |
| 2,962,174 | 11/1960 | Shekels _____ 214—18 |
| 3,028,053 | 4/1962 | Brown et al. _____ 198—220 X |
| 3,253,723 | 5/1966 | Calderon _____ 214—18 |
| 3,279,628 | 10/1966 | Brouwer et al. _____ 214—26 |

ROBERT G. SHERIDAN, *Primary Examiner.*